United States Patent
Sasaki

[19]

[11] Patent Number: 5,913,423
[45] Date of Patent: Jun. 22, 1999

[54] CASSETTE ACCOMMODATION CASE

[75] Inventor: Shigeru Sasaki, Miyagi, Japan

[73] Assignee: Sony Corporation, Japan

[21] Appl. No.: 09/059,269

[22] Filed: Apr. 14, 1998

[30] Foreign Application Priority Data

Apr. 18, 1997 [JP] Japan .................................... 9-101813

[51] Int. Cl.⁶ ................................................ B65D 85/672
[52] U.S. Cl. ..................... 206/387.12; 206/472; 206/493
[58] Field of Search ........................... 206/387.1, 387.12, 206/387.13, 387.15, 472, 493, 475

[56] References Cited

U.S. PATENT DOCUMENTS

| | | |
|---|---|---|
| 3,664,492 | 5/1972 | Wallace . |
| 3,998,324 | 12/1976 | Roccaforte ............................. 206/493 |
| 4,196,806 | 4/1980 | Posso .................................. 206/387.1 |
| 4,253,567 | 3/1981 | Goldammer . |
| 4,304,331 | 12/1981 | Minkow ............................... 206/387.1 |
| 4,383,610 | 5/1983 | Boshears . |
| 4,406,369 | 9/1983 | Wallace et al. . |
| 4,651,876 | 3/1987 | Tanuma et al. ....................... 206/387.1 |
| 5,042,659 | 8/1991 | Morita ................................. 206/387.1 |

FOREIGN PATENT DOCUMENTS

| | | |
|---|---|---|
| 0493845A2 | 7/1992 | European Pat. Off. . |
| 2306498 | 10/1976 | France . |
| 2508222 | 12/1982 | France . |
| 9300553 | 5/1993 | Germany . |
| 2231861 | 11/1990 | United Kingdom . |
| WO98/01369 | 1/1998 | WIPO . |

*Primary Examiner*—Paul T. Sewell
*Assistant Examiner*—Nhan T. Lam
*Attorney, Agent, or Firm*—Rader, Fishman & Grauer; Ronald P. Kananen

[57] ABSTRACT

In a cassette accommodation case (1) having such a structure for laterally inserting a cassette in a sliding fashion for its accommodation from an inserting mouth portion (2) provided on its one side, a cassette can smoothly be inserted at a time without ascertaining the face direction of the case. To this end, concave grooves (3a) and (3b) are symmetrically provided on both the left and the right sides of a cassette inserting direction for escaping swelled portions of the cassette.

2 Claims, 8 Drawing Sheets

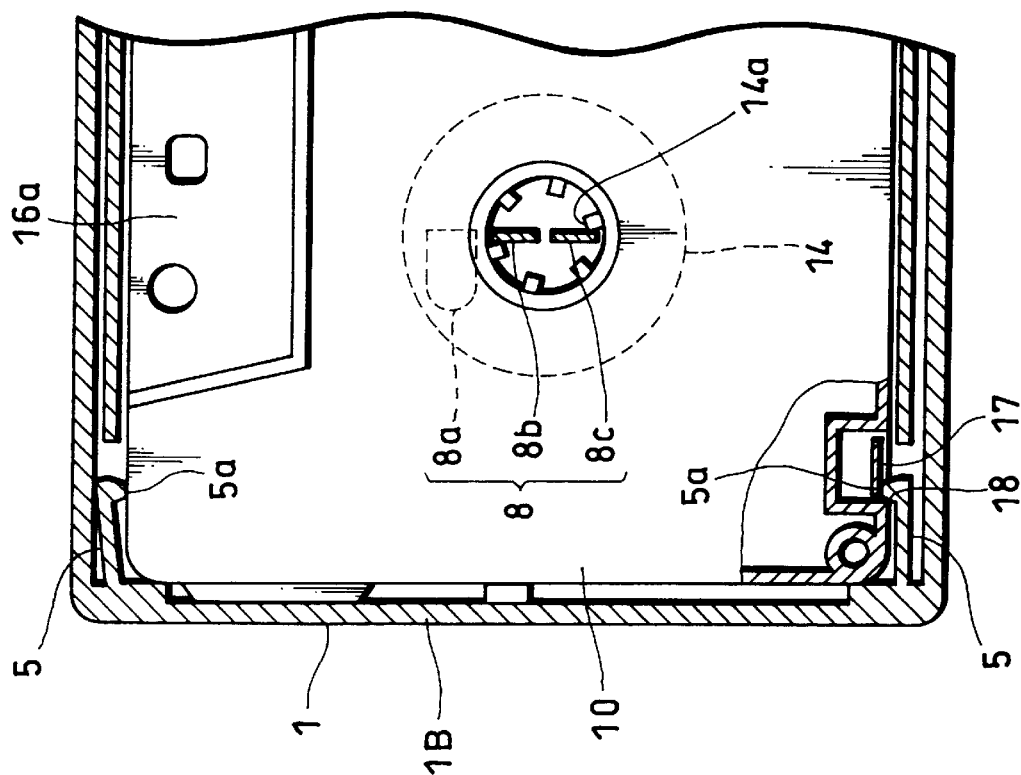
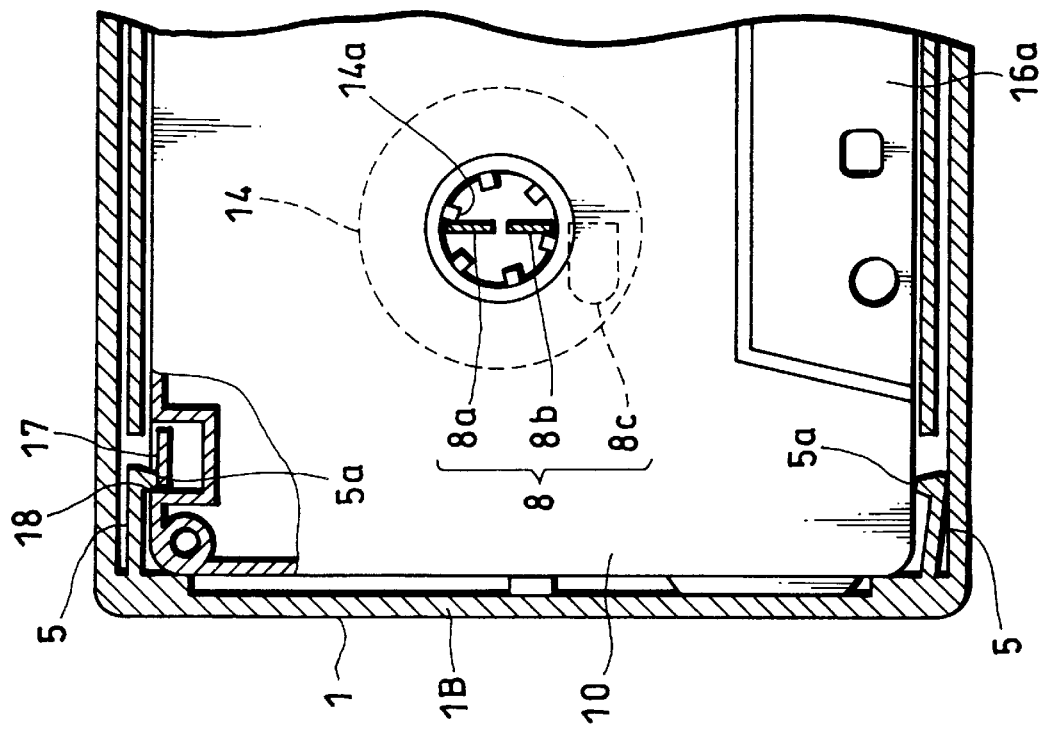

CASSETTE ACCOMMODATION CASE

BACKGROUND

FIELD OF THE INVENTION

The present invention relates to a cassette accommodation case which accommodates and keeps a tape cassette not in use and particularly, to a slide-type cassette accommodation case to accommodate and keep the tape cassette being laterally inserted thereinto from an inserting mouth portion provided on its one side.

BACKGROUND OF THE INVENTION

In recent years, in a cassette accommodation case for accommodating and keeping an audio compact cassette, a slide-type cassette accommodation case for accommodating a cassette by laterally inserting the cassette through an inserting mouth portion provided on its one side has been practiced.

A structure of the conventional slide-type cassette accommodation case will be described with reference to FIG. 1 through FIG. 5.

In FIGS. 1 to 5, reference numeral 1 shows a cassette accommodation case and an audio compact cassette (hereafter, referred to simply as a cassette) 10 is accommodated in the cassette accommodation case 1 by being inserted from an inserting mouth portion 2 provided on its one side thereof.

First of all, to simply describe the structure of the cassette 10, as shown in FIG. 1, a hub driving shaft inserting hole 12 is formed through a cassette housing 11 of the cassette 10 at its left and right portions, and a pair of hubs 14 corresponding to the hub driving shaft inserting holes 12 for winding a magnet tape 13 are rotatably accommodated within of the cassette housing 11.

An opening portion 15 through which the magnet tape 13 is exposed is formed in front of the cassette housing 11 and in the cassette housing 11, a tape travelling path is formed such that the magnet tape 13 led out from the hub (supply side hub) 14 on one side passes through the opening portion 15 and is wound up by the hub (winding side hub) 14 on the other side.

A magnet head and the like are supposed to be inserted into the opening portion 15 from a cassette deck side and swelled portions 16a and 16b in a trapezoid shaped swelling portions of both the upper and the lower surface sides are formed at the front portion of the cassette housing 11 to ensure the thickness of the inserting portion of the magnet head and the like.

The cassette accommodation case 1 into which the cassette 10 is inserted is structured by uniting an upper half 1A and a lower half 1B. The upper half 1A is a molded plastic product molded from, for example, GPPS (general purpose poly ethylene) as its material and also, the lower half 1B is a molded plastic product molded from, for example, HIPS (impact-proof polyethylene) as its material. The upper half 1A and the lower half 1B are integrally united by means of ultra-deposition and the like while in a state of being united.

Then, the inserting mouth portion 2 is provided on one side surface of the cassette accommodation case 1 with its surface being wholly opened, which is so structured that the cassette 10 is laterally inserted from the inserting mouth portion 2 in a sliding fashion.

The cassette accommodation case 1 is such that the cassette 10 is accommodated therein almost without any clearance, and therefore, on the inner surface of each of the upper half 1A and the lower half 1B in the inside of the cassette accommodation case 1, concave grooves 3a and 3b for escaping the swelled portions 16a and 16b of the cassette 10 are respectively formed in a lateral direction, that is, in a cassette inserting direction as shown in, for example, FIG. 2.

Also, nearly at a central portion of the upper half 1A of the cassette accommodation case 1, a long opening portion 4 of an oblong shape in a cassette inserting direction is formed. When the cassette 10 is to be taken out from the cassette accommodation case 1, the cassette 10 is pushed out by putting a finger (for example, a thumb) from the opening portion 4.

Further, a stopper tab 5 is provided inside the cassette accommodation case 1 so as to prevent the cassette 10 from unexpectedly jumping out from a state of the cassette 10 being accommodated.

The stopper tab 5 is integrally projectingly formed on the lower half 1B and an engaging convex portion 5a is provided at a tip end portion thereof. Then, in the state of the cassette 10 being accommodated in the cassette accommodation case 1, the engaging convex portion 5a of the stopper tab 5 is, as shown in FIG. 5, engaged with an edge of a hole portion 18 in which a erroneous erasure prevention detecting nail 17 is provided, which keeps the cassette 10 in a lightly locked state in the cassette accommodation case 1, thereby preventing the cassette 10 from unexpectedly jumping out (coming off) from the cassette accommodation case 1.

Further, as shown in, for example, FIG. 2, a rotation stopping member 6 is equipped within the cassette accommodation case 1 for preventing the magnet tape from becoming loose by checking unnecessary rotations of the hubs 14 in the cassette 10.

The rotation stopping member 6 is a molded plastic product molded from, for example, PP (polypropylene) as its material and is structured in a way that rotation stopping projecting tabs 8 corresponding to the hub driving shaft inserting holes 12 of the cassette 10 are projectingly formed on a base plate portion 7 to be capable of elastically standing up and down, and the base plate portion 7 is attached by being caulked and fixed to caulking projections 9 projectingly provided nearly at a central portion of the inside of the lower half 1B.

Then, when the cassette 10 is inserted into the cassette accommodation case 1, the rotation stopping projecting tabs 8 are pushed down by the cassette 10. When the cassette 10 is completely accommodated in the cassette accommodation case 1, since the hub driving shaft inserting holes 12 of the cassette 10 correspond to the rotation stopping projecting tabs 8, respectively, the rotation stopping projecting tabs 8 elastically return to an erect state and engage with engagement projecting tabs 14a formed on an internal circumference of the hub 14 to check the rotation of the hubs 14 as shown in, for example, FIGS. 4 and 5.

In the conventional cassette accommodation case 1 structured in the above mentioned manner, because of the structure in which the concave grooves 3a and 3b to escape the swelled portions 16a and 16b of the cassette 10 are formed only on one side (in this example, a left side of the cassette inserting direction), when the cassette 10 is inserted into the cassette accommodation case 1, it can not be inserted unless the swelled portions 16a and 16b face the concave grooves 3a and 3b, respectively.

Therefore, at a time of the cassette being inserted, it becomes necessary to ascertain a direction of the cassette at every insertion, thereby causing inordinate inconveniences.

When the cassette is inserted without ascertaining the direction of the cassette, at a rate of about half the number of times, the cassette can not be inserted, so in that case, the cassette must be inserted again after correcting the direction thereof. Because it is difficult to ascertain a shape of the cassette particularly in a dark place (for example, in a car at night), there have been many occasions in which the insertion of the cassette can not be well done at a time, only to be tried again, thereby causing great inconveniences.

SUMMARY OF THE INVENTION

The present invention is implemented with an object to solve these problems.

In order to achieve the above mentioned object, according to the present invention, in a cassette accommodation case having a structure for accommodating a cassette by laterally inserting the cassette from an inserting mouth portion provided on its one side surface and in which concave grooves are formed on the inner side surface for escaping swelled portions of the cassette, there is provided a structure in which the concave grooves are provided symmetrically on both left and right sides of the inserting direction of the cassette to make it possible to insert the cassette in whichever directions it faces.

In the cassette accommodation case being structured in this manner according to the present invention, it is not necessary to ascertain the direction of the cassette every time it is inserted, so the cassette can be smoothly inserted at a time even in a dark place.

BRIEF DESCRIPTION OF THE DRAWINGS

FIGS. 9A and 9B are each a transverse sectional plan view of a state in which the cassette is accommodated in the case with a part being cut off.

DESCRIPTION OF THE PREFERRED EMBODIMENT

Figure 1:
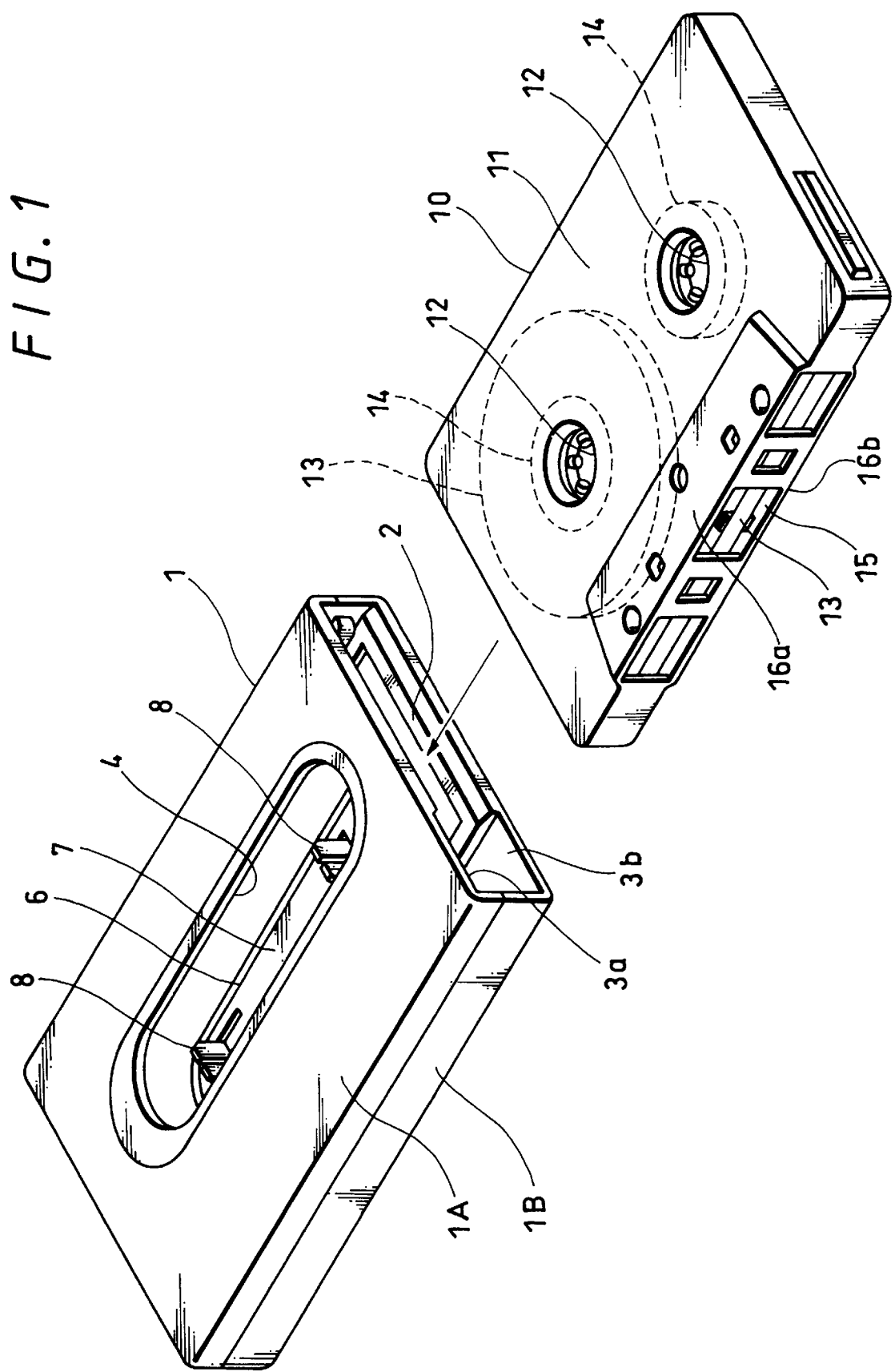
FIG. 1 is a perspective view showing an example of a conventional cassette accommodation case and a cassette.
Figure 2:
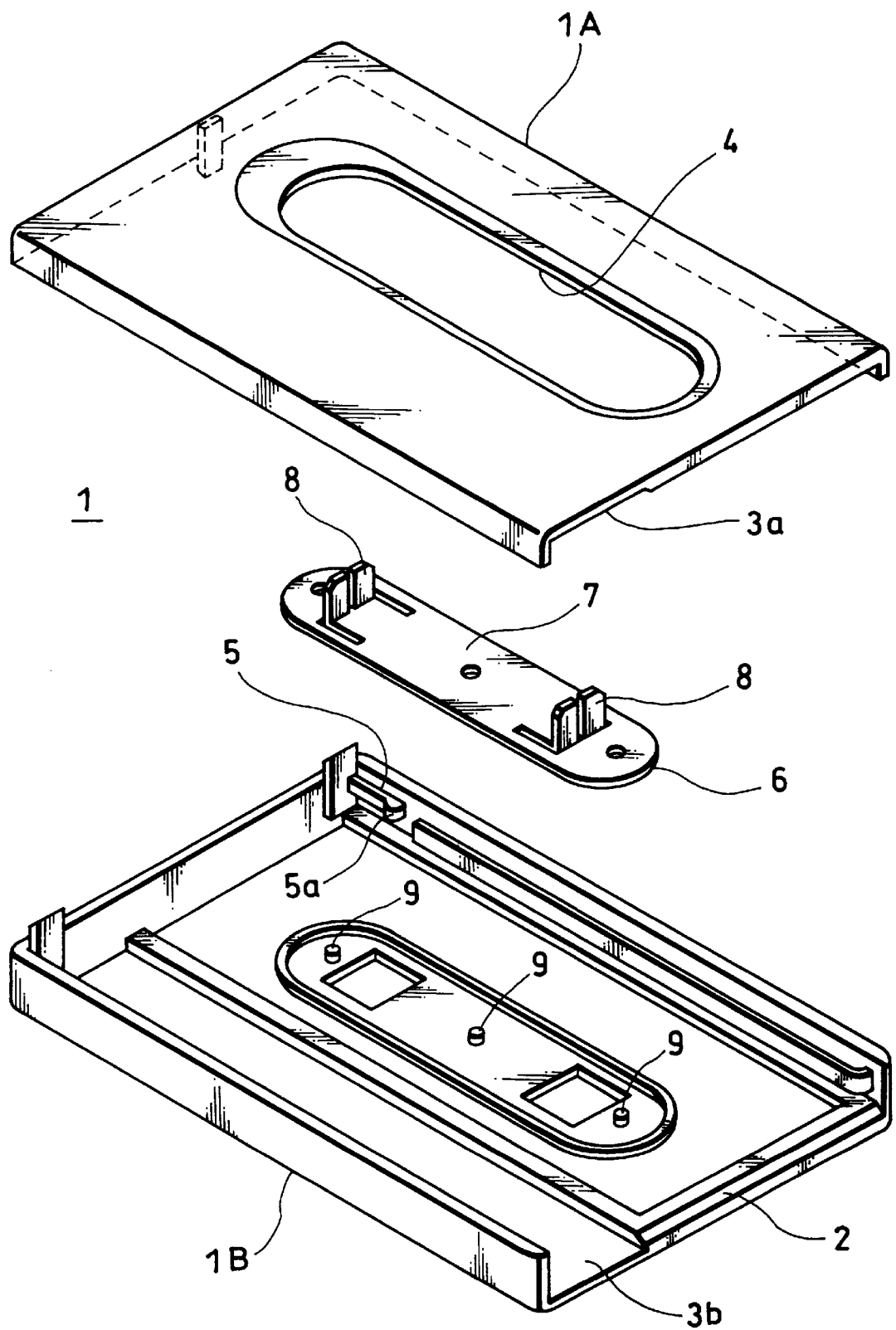
FIG. 2 is an exploded perspective view of the cassette accommodation case.
Figure 3:
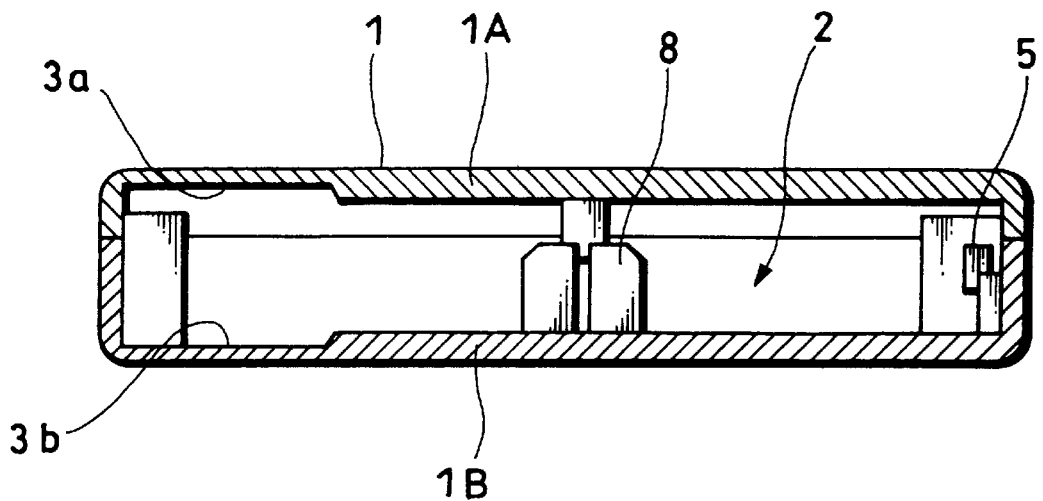
FIG. 3 is a cross-sectional side view of the cassette accommodation case.
Figure 4:
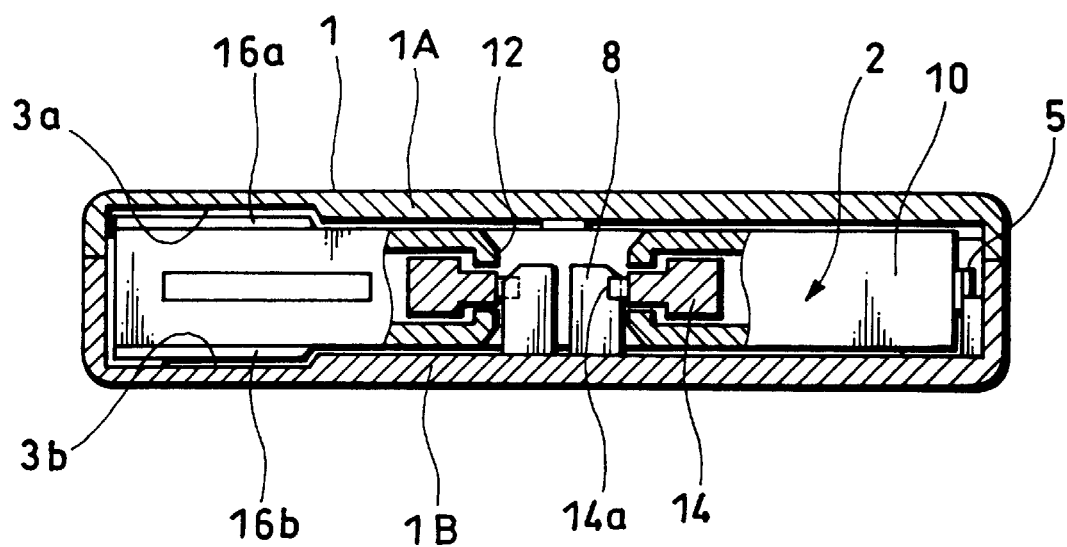
FIG. 4 is a cross-sectional side view of a state in which a cassette is accommodated in the case with a part being cut off.
Figure 5:
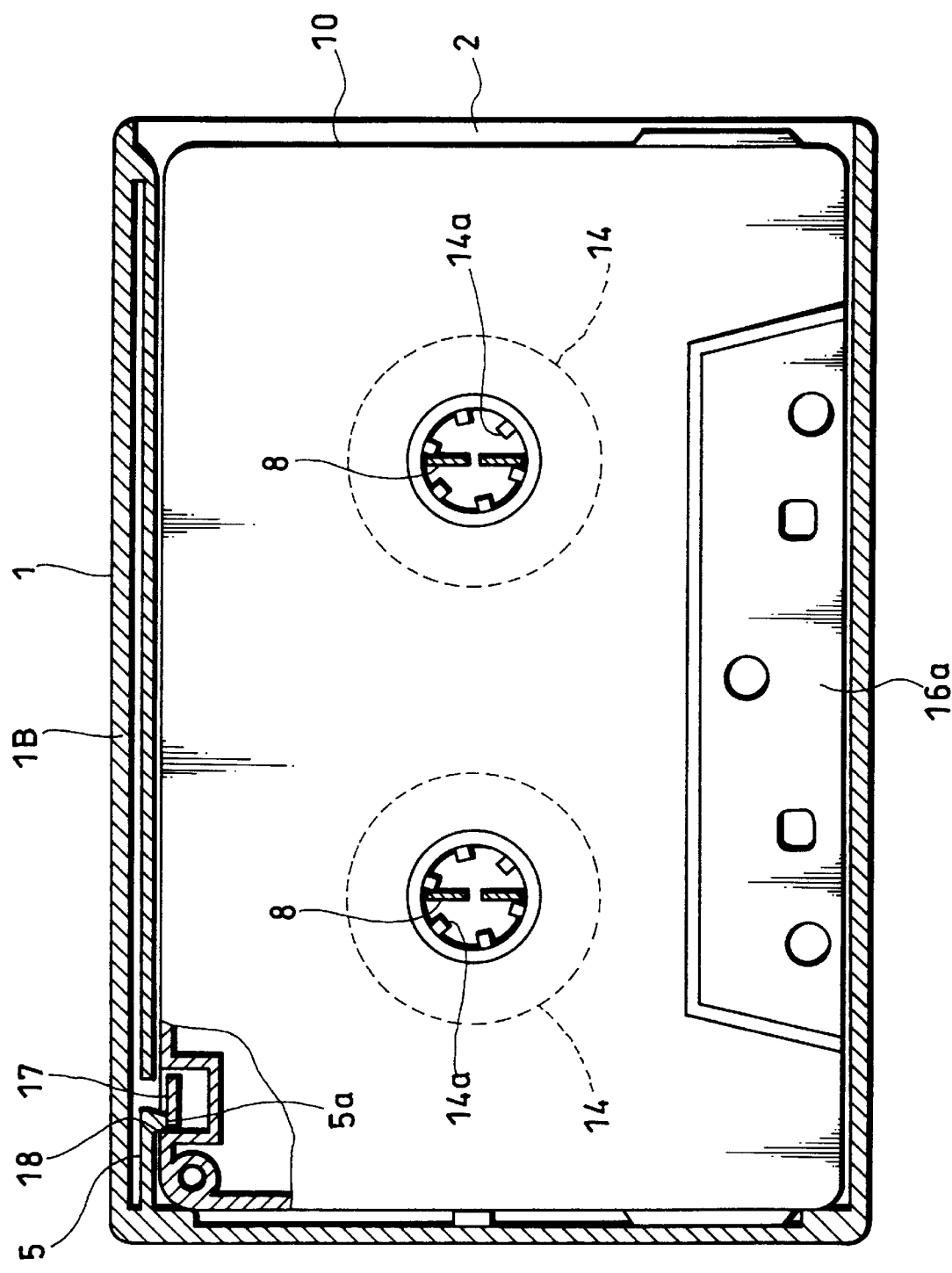
FIG. 5 is a transverse sectional plan view of the cassette accommodation case in a state where the cassette is accommodated in the case with a part being cut off.

Hereafter, one example of the embodiment according to the present invention will be described with reference to FIG. 6 through FIG. 9.

A fundamental structure of a cassette accommodation case shown in the example is the same as that of the cassette accommodation case in the above mentioned conventional example.

Specifically, a cassette accommodation case 1 of this example is structured by uniting an upper half 1A and a lower half 1B. In this example, the upper half 1A is a molded plastic product molded from, for example, GPPS (general purpose poly ethylene) as its material and also, the lower half 1B is a molded plastic product molded from, for example, HIPS (impact-proof polyethylene) as its material. The upper half 1A and the lower half 1B are further integrally united by means of ultrasonic-deposition and the like in a state of being united.

Then, an inserting mouth portion 2 is provided on its one surface side of the cassette accommodation case 1 with its surface being wholly opened, and a cassette 10 is laterally inserted from the inserting mouth portion 2 in a sliding fashion.

The cassette accommodation case 1 is such that the cassette 10 is accommodated the rein almost without any clearance, and therefore, on the inner surface sides of the upper half 1A and the lower half 1B in the cassette accommodation case 1, concave grooves 3a and 3b for escaping swelled portions 16a and 16b of the cassette 10 are respectively formed in a lateral direction, that is, in a cassette inserting direction.

Here, particularly, in the cassette accommodation case 1 of this example, the concave grooves 3a and 3b are provided symmetrically on both left and right sides of the cassette inserting direction, thereby leading to a structure in which the cassette 10 can be inserted irrespective of whichever directions it faces.

Figure 8A:
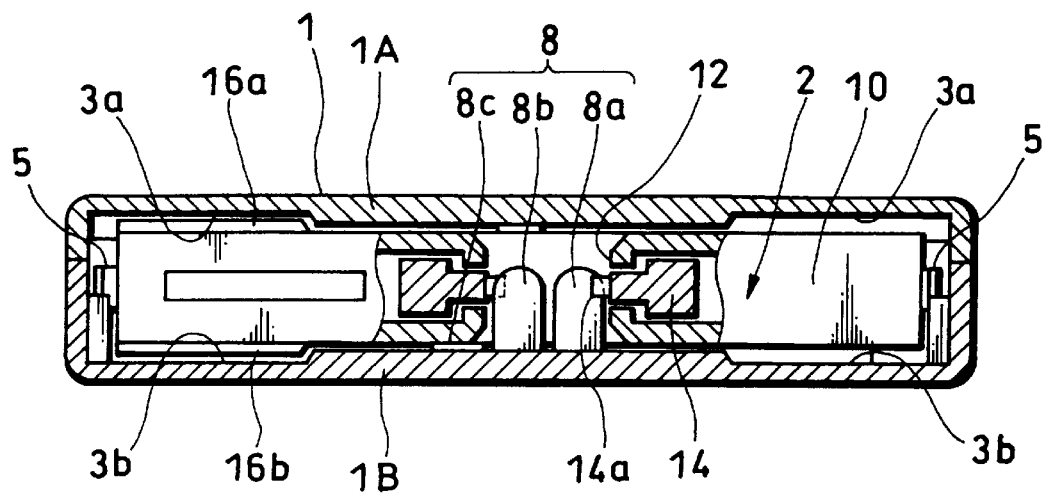
FIGS. 8A and 8B are each a cross-sectional side view of a state in which the cassette is accommodated in the case with a part being cut off.
Figure 8B:
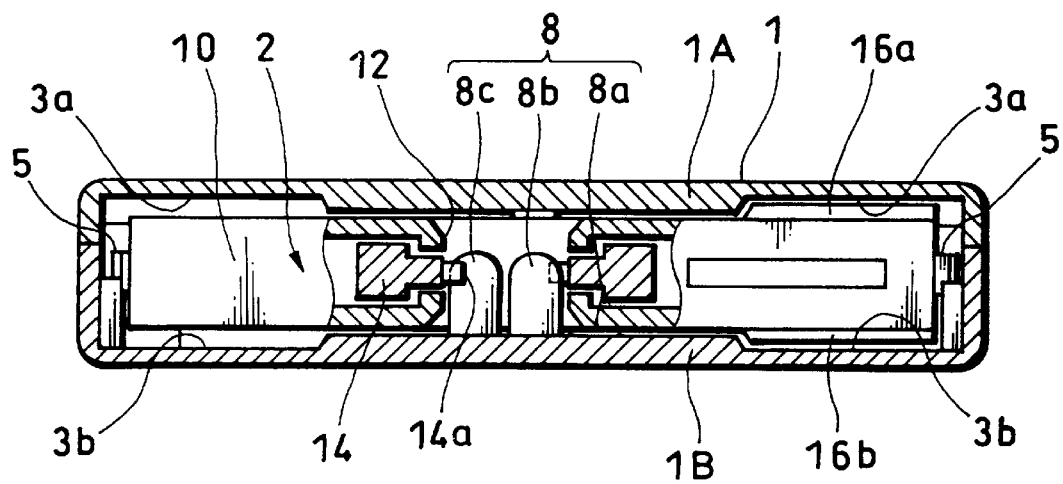

That is, FIG. 8A shows a state in which the cassette 10 is accommodated in the cassette accommodation case 1 in a way that the swelled portions 16a and 16b of the cassette 10 face the left side of the cassette inserting direction, while FIG. 8B shows a state in which the cassette 10 is accommodated in the cassette accommodation case 1 in a way that the swelled portions 16a and 16b face the right side of the cassette inserting direction. Since it is possible to insert and accommodate the cassette 10 in the cassette accommodation case 1 irrespective of whichever directions it faces, a user doesn't have to ascertain the direction of the cassette 10 every time he inserts the cassette 10, and hence, can smoothly insert the cassette 10 at a time under whatever circumstances, not to speak of in a dark place.

Also, in the cassette accommodation case 1, as molded portions of the concave grooves 3a and 3b are formed thin in thickness and the thin portions due to the concave grooves 3a and 3b exist on both the left and the right sides of the cassette inserting direction, the amount of plastic used as the molding material is pared down, thereby making it possible to reduce costs by that amount as well as achieve weight-lightening.

Figure 6:
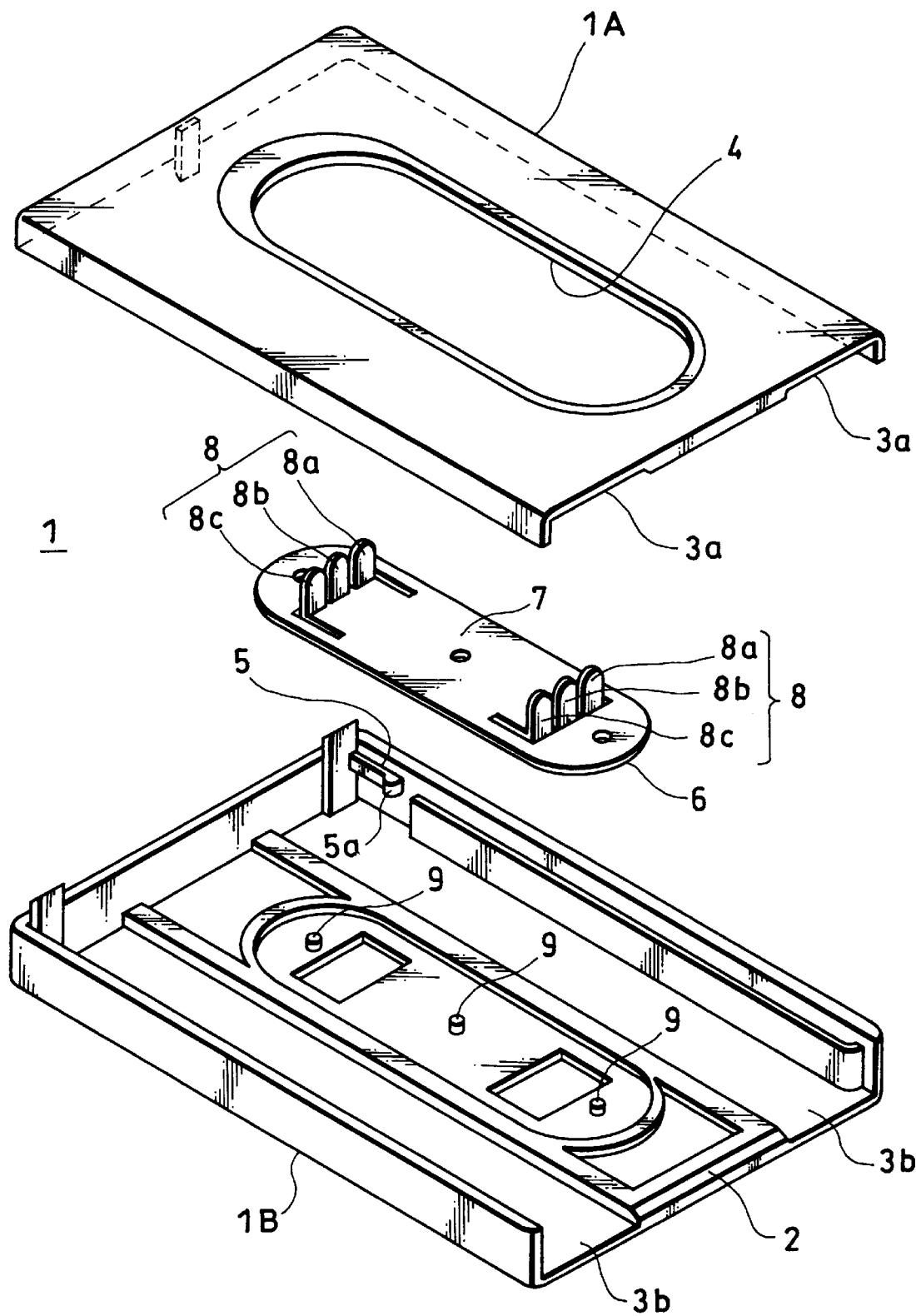
FIG. 6 is an exploded perspective view of a cassette accommodation case according to the present invention.
Figure 7:
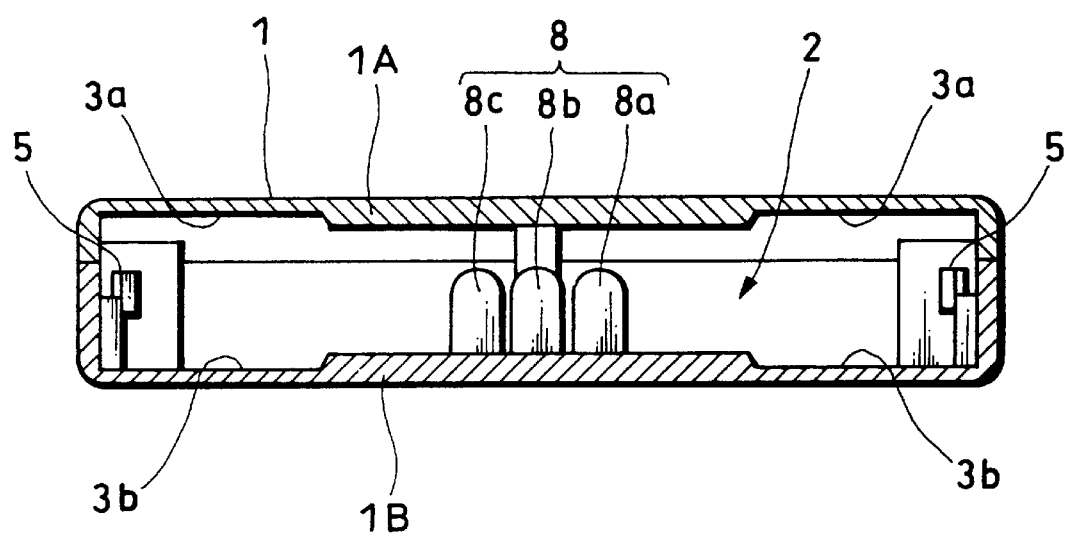
FIG. 7 is a cross-sectional side view of the same.

Also, as shown in FIG. 6, nearly at a central portion of the upper half 1A of the cassette accommodation case 1, an opening portion 4 of an oblong shape in a cassette inserting direction is formed. Thus, when the cassette 10 is to be taken out from the cassette accommodation case 1, the cassette 10 is pushed out from the cassette accommodation case 1 by putting in a finger (for example, a thumb) from the opening portion 4.

Further, a stopper tab 5 is provided inside the cassette accommodation case 1 so as to prevent the cassette 10 from unexpectedly jumping out from the cassette accommodation case 1 under the state where the cassette 10 is accommodated.

The stopper tab 5 is integrally projectingly formed in the lower half 1B and an engaging convex portion 5a is provided at a tip end portion of the stopper tab 5. Then, in the state where the cassette 10 is accommodated in the cassette accommodation case 1, since the engaging convex portion 5a of the stopper tab 5, as shown in FIG. 9A and 9B, engages with an edge of a hole portion 18 in which an erroneous erasure prevention detecting nail 17 of the cassette 10 is provided, the cassette 10 is held in a lightly locked state in the cassette accommodation case 1, thereby preventing the cassette 10 from unexpectedly jumping out (coming off) from the cassette accommodation case 1.

The cassette accommodation case 1 of the present example has, as mentioned above, such a structure that the cassette 10 can be inserted thereinto irrespective of whichever directions it faces, so the stopper tab 5 is provided symmetrically on both the left and the right sides of the cassette inserting direction.

That is, FIG. 9A shows a state in which the cassette 10 is accommodated in the cassette accommodation case 1 in a way that the swelled portions 16a and 16b thereof face the left side of the cassette inserting direction, and in this case, the stopper tab 5 on the right side of the cassette inserting direction engages with the hole portion 18 of the cassette 10 to hold the cassette 10 (at this time, the stopper 5 on the left side of the cassette inserting direction is escaping from the cassette 10 due to undergoing an elastic deformation Also, FIG. 9B shows a state in which the cassette 10 is accommodated in the cassette accommodation case 1 in a way that the swelled portions 16a and 16b thereof face the right side of the cassette inserting direction, and in this case, the stopper tab 5 on the left side of the cassette inserting direction engages with the hole portion 18 of the cassette 10 to hold the cassette 10 (at this time, the stopper 5 on the right side of the cassette inserting direction is escaping from the cassette 10 due to undergoing an elastic deformation).

As set forth above, according to the cassette accommodation case 1 of this embodiment, whenever the cassette case 10 is inserted thereinto in any cases of whichever directions it faces, the cassette 10 can surely be held in the cassette accommodation case 1 and prevented from jumping out of the cassette accommodation case 1.

Further, as shown in, for example, FIG. 6, on the inside of the cassette accommodation case 1, a rotation stopping member 6 is equipped for preventing the magnet tape from becoming loose by checking unnecessary rotations of the hubs 14 in the cassette 10.

The rotation stopping member 6 is a molded plastic product molded from, for example, PP (polypropylene) as its material and is structured in a way that rotation stopping projecting tabs 8 corresponding to the hub driving shaft inserting holes 12 of the cassette 10 are projectingly formed on a base plate portion 7 to be capable of elastically standing up and down, and the base plate portion 7 is attached by being caulked and fixed to caulking projections 9 projectingly provided nearly at a central portion of the inside of the lower half 1B.

Then, when the cassette 10 is inserted into the cassette accommodation case 1, the rotation stopping projecting tabs 8 are pushed down by the cassette 10 and then the cassette 10 is completely accommodated in the cassette accommodation case 1, due to the hub driving shaft inserting holes 12 corresponding to the rotation stopping projecting tabs 8, the rotation stopping projecting tabs 8 elastically return to the erect state and engage with engagement projecting tabs 14a formed on the internal circumferences of the hubs 14 to check the rotation of the hubs 14.

In the rotation stopping member 6, especially according to the embodiment, each of the rotation stopping projecting tabs 8 is so structured that it is comprised of three tabs; 8a, 8b, 8c, and two tabs out of them engage with each of the hubs 14 to check the rotation of the hub 14.

That is, as shown in FIG. 8A and FIG. 9A, when the cassette 10 is in a state of being accommodated in the cassette accommodation case 1 with the swelled portions 16a and 16b facing the left side of the cassette inserting direction, two tabs 8a and 8b of each of the rotation stopping projecting tabs 8 engage with the engagement projecting tab 14a of each of the hubs 14 to check the rotation of the hub 14 (at this time, the remaining one tab 8c is in a state of being pushed down by the cassette 10).

Also, as shown in FIG. 8B and FIG. 9B, when the cassette 10 is in a state of being accommodated in the cassette accommodation case 1 with the swelled portions 16a and 16b facing the right side of the cassette inserting direction, two tabs 8b and 8c of each of the rotation stopping projecting tabs 8 engage with the engagement projecting tab 14a of each of the hubs 14 to check the rotation of the hub 14 (at this time, the remaining one tab 8a is in a state of being pushed down by the cassette 10).

As described above, according to the cassette accommodation case 1 of the embodiment, whichever side of the cassette 10 is inserted, the hub 14 thereof can surely be prevented from rotating unnecessarily by the rotation stopping projecting tab 8 and the magnet tape is prevented from getting loose.

Further, in this embodiment, as apparent from the drawing, a tip end shape of each of the respective tabs 8a, 8b and 8c of the rotation stopping projecting tabs 8 is formed in a curvilinear shape (an arc shape). Therefore, at a time of the cassette 10 being inserted into the cassette accommodation case 1 (or at a time of being taken out therefrom), even when the cassette 10 rubs against the tip end portions of the respective 8a, 8b and 8c, scratches are difficult to occur easily on a surface of the cassette 10, that is, leading to effective protection of the cassette.

As apparent from the above mentioned description, the cassette accommodation case according to the present invention is so structured that whichever side of the cassette can be inserted thereinto, it is not necessary to ascertain the direction of the cassette every time the cassette is inserted, and that under whatever circumstances, the cassette can smoothly be inserted at a time, thereby leading to being very convenient.

Further, in the cassette accommodation case according to the present invention, becoming thinner in thickness leads to the reduction of molding materials, thereby paring down the costs by that amount and achieving weight-lightening as well.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A cassette accommodation case into which a cassette is laterally inserted to be accommodated therein from an inserting mouth portion provided on its one side and in which a first concave groove is formed on the inside for escaping a swelled portion of said cassette, comprising:

a second concave groove for escaping the swelled portion of said cassette provided in said cassette accommodation case such that said first and second concave grooves are located symmetrically on both left and right sides of said cassette accommodation case in a cassette inserting direction;

a stopper for preventing a cassette from jumping out, wherein said stopper is provided symmetrically on both left and right sides of said cassette accommodation case in a cassette inserting direction; and a rotation stopping projecting tab for checking rotation of a hub in a cassette, wherein said rotation stopping projection tab is comprised of three tabs, two of which engage said hub at any given time for checking rotation of said hub.

2. A cassette accommodation case as claimed in claim 1, wherein a tip end shape of each of said three rotation stopping projecting tabs is made to be of a curvilinear shape.

* * * * *